SINGLE CHANNEL AUTO-SYNCHRONIZING TELEGRAPH SYSTEM

Filed March 9, 1960 5 Sheets-Sheet 1

INVENTOR.
R. STEENECK
BY J. B. Burke
ATTORNEY

SINGLE CHANNEL AUTO-SYNCHRONIZING TELEGRAPH SYSTEM

Filed March 9, 1960 5 Sheets-Sheet 2

SINGLE CHANNEL AUTO-SYNCHRONIZING TELEGRAPH SYSTEM

Filed March 9, 1960

5 Sheets-Sheet 3

SINGLE CHANNEL AUTO-SYNCHRONIZING TELEGRAPH SYSTEM 3,012,097
SINGLE CHANNEL AUTO-SYNCHRONIZING TELEGRAPH SYSTEM

Robert Steeneck, New York, N.Y., assignor to The Western Union Telegraph Company, New York, N.Y., a corporation of New York Filed Mar. 9, 1960, Ser. No. 13,829
11 Claims. (Cl. 178—69.5)

This invention concerns a single channel, high speed, auto-synchronizing telegraph system employing electronic sending and receiving distributors.

According to the invention there is provided means for automatically phasing a receiving distributor by initiating the cycling of the receiving distributor in phase with the sending distributor prior to the transmission of intelligence and then devoting 100% of the transmission time for intelligence. Phasing is accomplished by automatically transmitting a series of "letters" characters, each comprising four marking pulses and one spacing pulse; and utilizing at the receiver the spacing pulse of one of the "letters" characters to condition a predetermined stage of the receiving distributor to initiate the cycling. Synchronism is maintained thereafter by utilizing signal crossovers from one polarity to another to lock in a multivibrator oscillator that drives the receiving distributor.

It is therefore one object of the invention to provide a novel means for automatically phasing a receiving distributor in a telegraph system.

A further object is to provide means for automatically phasing, sending and receiving distributors in a telegraph system prior to transmission of intelligence, so that all subsequent transmission time is devoted to transmission of intelligence without phasing signals and utilizing crossovers of intelligence signals to maintain synchronism between sending and receiving distributors.

Another object is to provide a single channel auto-synchronizing telegraph system which avoids the use of start-stop pulses for phasing and synchronizing purposes.

The invention will be best understood from the following description taken together with the drawing, wherein:

FIGS. 1 and 2 taken together constitute a circuit diagram of a transmitter portion of the system;

Figure 5:
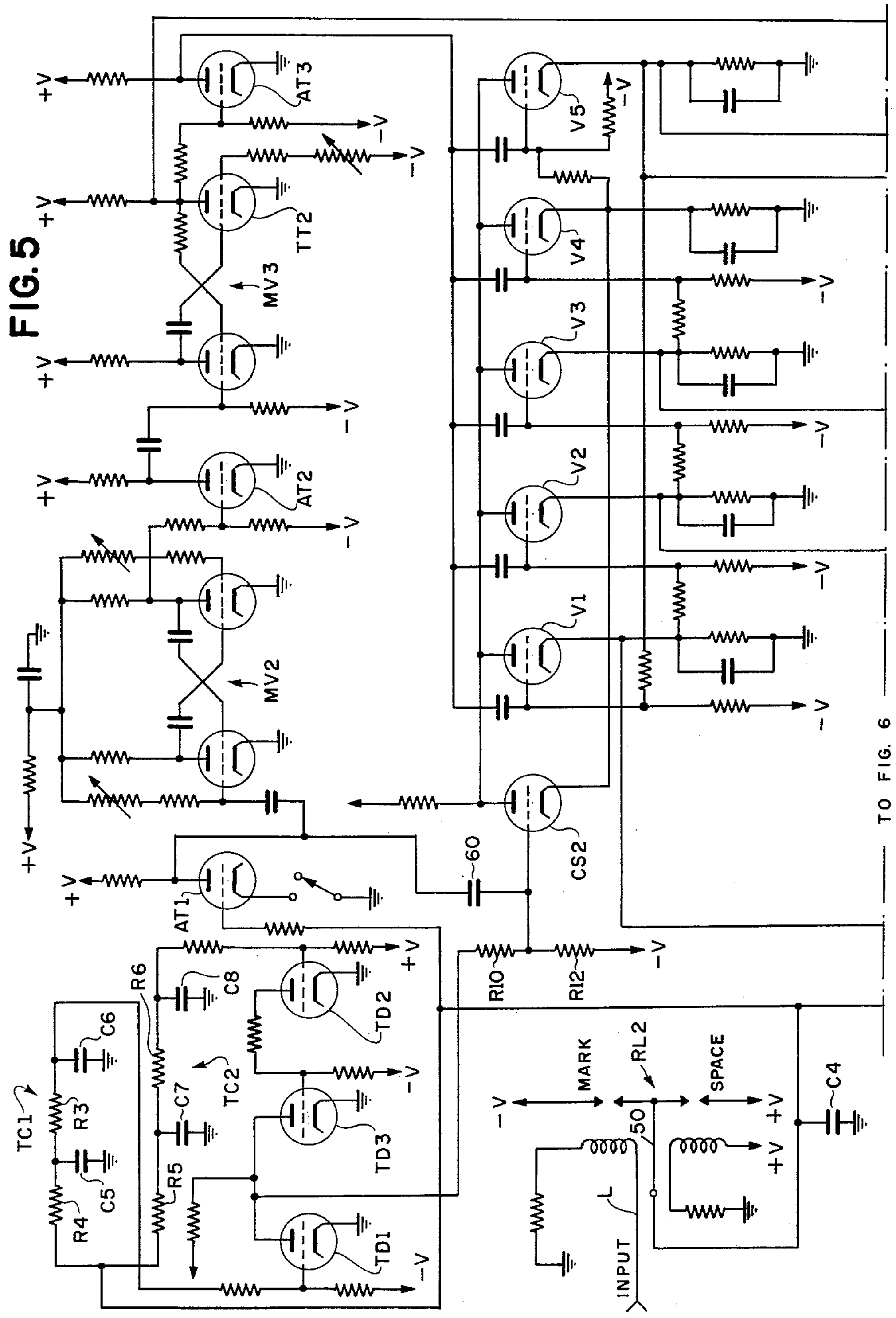
Figure 6:
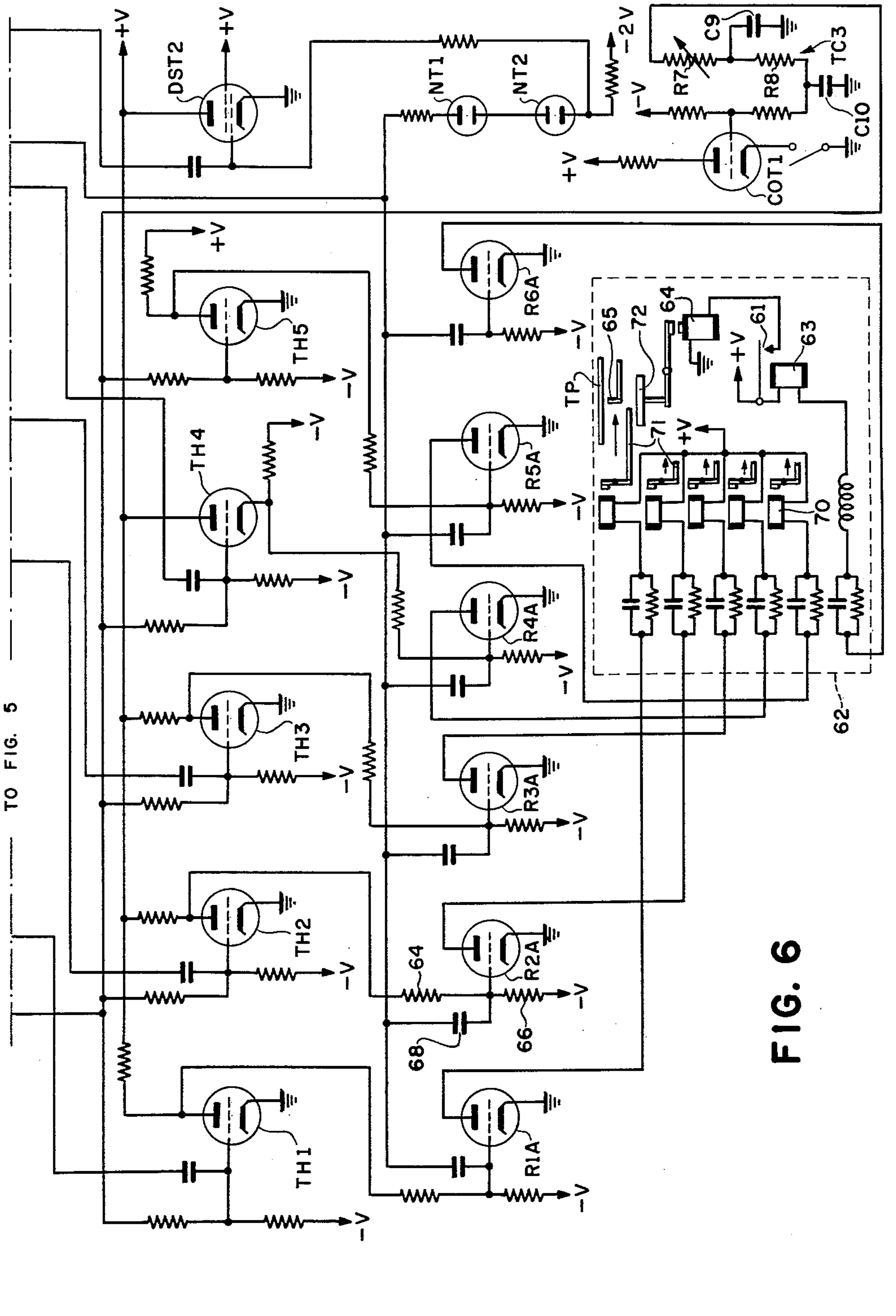

FIGS. 5 and 6 taken together constitute a circuit diagram of a receiver portion of the system.

*Sending system*

Figure 1:
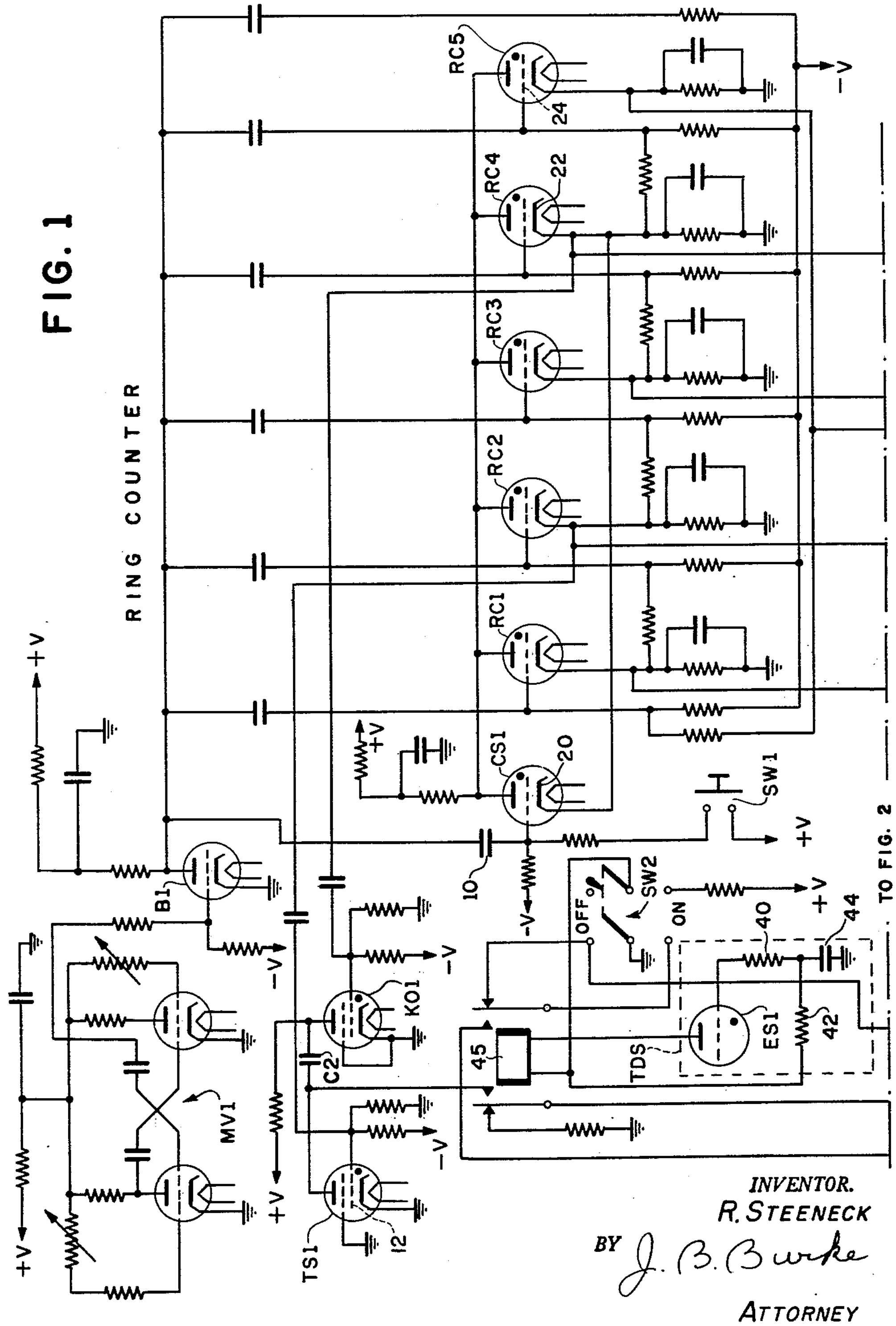
Figure 2:
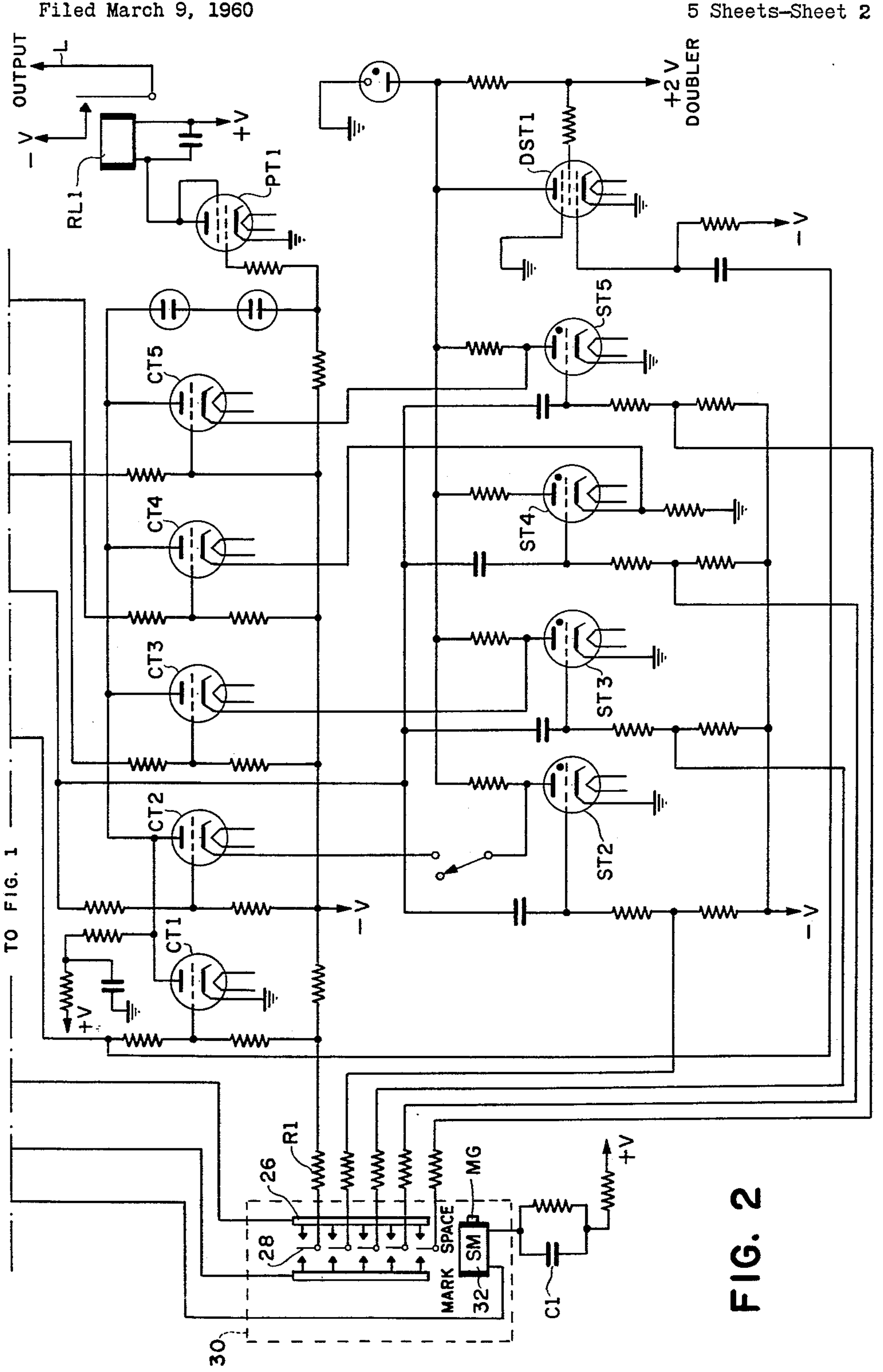

Referring to FIGS. 1 and 2, taken together, there is shown an electronic distributor including a five-stage ring counter having five thyratrons RC1–RC5. A free running multivibrator MV1 serves as a driving stage for the ring counter. A thyratron CS1 serves to fire the counter upon receiving a pulse from the multivibrator. A momentarily operated pushbutton switch SW1 in series with the grid of thyratron CS1 fires this tube.

A storage device or circuit is required for storing information during the tape stepping pulses. This device includes four thyratrons ST2–ST5 shown in FIG. 2. The ring counter gates information set up by the storage thyratrons to combining tubes CT1–CT5. These combining tubes drive a power tube PT1 which operates an output relay RL1.

Figure 3:
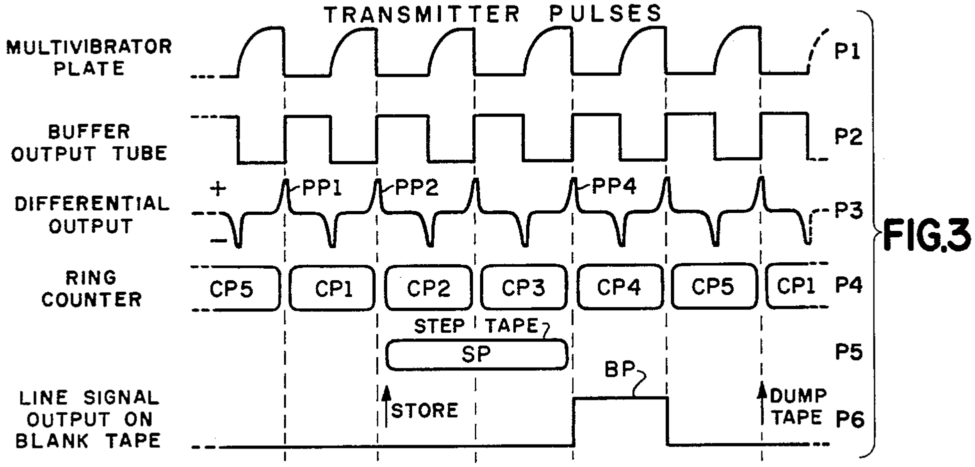
FIG. 3 is a graphic diagram illustrating various wave shapes of transmitter pulses employed in the system.

Pulses P1 produced at the output of the multivibrator MV1 are shown graphically in FIG. 3. These pulses are produced at a predetermined frequency. The output of the multivibrator is applied to a buffer tube B1. The buffer tube B1 produces square pulses P2 as shown in FIG. 3. These pulses are differentiated by a capacitor 10 to produce the spiked differential pulses P3. Only the positive pips of these pulses affect the ring counter.

To start the ring counter, pushbutton switch SW1 is closed momentarily. A positive potential is applied to the grid network of thyratron CS1. The thyratron CS1 is raised in potential to a point just below its firing potential and is thus conditioned to fire on the first positive pip resulting from multivibrator output. Cathode 20 of thyratron CS1 is connected to cathode 22 of thyratron RC4 in the ring counter. When the thyratron CS1 is conducting a positive potential results at the cathode 22. This positive voltage raises the potential at grid 24 of thyratron RC5, conditioning this tube to fire under the influence of the positive pips obtained from multivibrator via the buffer stage.

The firing of thyratron RC5 conditions thyratron RC1 to fire. Thyratron RC1 in turn conditions thyratron RC2 to fire. RC2 in turn conditions thyratron RC3 to fire. RC3 conditions thyratron RC4 to fire. It will be noted that the grid of each successive tube in the ring counter is in circuit with the cathode of the preceding tube so that as each tube fires and is rendered conductive a positive potential is applied to the grid network of the succeeding tube conditioning it for firing. FIG. 3 shows pulses P4 emitted by the successive thyratrons upon being fired. Pulses P4 are successively designated CP1–CP5 in cyclic fashion. The firing of each thyratron RC1–RC5 occurs at the positive pips of the differential output P3.

The spacing bus bar 26 of tape transmitter 30 is maintained at ground potential. When the tongues 28 of the tape transmitter 30 are on the spacing bus bar, storage tubes ST2 to ST5 are conditioned to fire. The spacing selected in the transmitter thus conditions storage. When a positive pip PP2 is generated at the beginning of the second pulse CP2 of the ring counter, storage tubes ST2 to ST5 will fire if the associated tongues 28 or tape reading pins (not shown) of the transmitter 30 are on spacing. No storage tube is provided for the first ring counter pulse CP1 because the ring counter gates information set up by the first tape reading pin of the transmitter directly via resistor R1 to combining tube CT1 from which it is fed into power tube PT1 operating output relay RL1.

The stepping action of the tape at transmitter 30 starts at the beginning of the second pulse CP2 and continues during the period of the second and third pulses CP2 and CP3. This is accomplished by a thyratron tube TS1. The grid 12 of tube TS1 is biased so that when positive pip PP2 is generated at the beginning of the second pulse CP2 the tube will fire and pull up a tape stepping magnet MG in the transmitter 30. A capacitor C1 in series with coil 32 of the tape stepping magnet MG shapes the stepping pulse for maximum current at the start. The stepping pulse SP is indicated for signal P5 in FIG. 3.

The cut-off of the tape stepping action takes place at the beginning of the fourth pulse CP4. This is accomplished by a thyratron tube KO1. When the positive pip PP4 generated at the beginning of the fourth pulse CP4 fires tube KO1, the potential at the plate of tube KO1 drops. A capacitor C2 is connected across the plates of tubes TS1 and KO1. When capacitor C2 is charged the voltage across the capacitor can not change instantly; the potential at the plate of tube GS1 drops and tube TS1 is cut off.

The ring counter gates information set up by the storage thyratron tubes ST2–ST5 to combining tubes CT2–CT5. These combining tubes feed directly into power tube PT1 which operates output relay RL1.

Assume now that one of storage tubes ST2–ST5 is fired, thus indicating spacing at the transmitter. The plate of the storage tube will be almost at ground potential. Since the cathode of the associated combining tubes CT2–CT5 is connected to the plate of the storage tube, it too will be almost at ground potential. Therefore, when a positive pulse P4 is generated from a ring counter cathode associated with a particular combining tube, that combining tube will conduct. In the case where the storage tube is not fired, thus indicating marking, the cathode of the combining tube will be at a high potential. Therefore, the combining tube can not conduct as its grid can not override the high positive potential on its cathode.

The second, third and fifth pulses, CP2, CP3 and CP5 are gated from the plates of the storage tubes ST2, ST3, ST5. Pulse CP4 is gated from the cathode of the storage tube ST4. This will reverse pulse CP4 and always provide a pulse BP over the line while blanks are being transmitted during idle periods as shown on the line signal output P6 in FIG. 3.

The storage tubes ST2 to ST5 are extinguished at the beginning of pulse CP1. This will clear the storage tubes and the tubes will be ready to store again when the gating pulse CP2 comes from the ring counter. The extinguishing action is done by a power tube DST1. When a positive pip PP1 generated at the beginning of pulse CP1 causes tube DST1 to conduct, it greatly lowers the potential on its plate. The plates of the storage tubes ST2–ST5 which are connected to the plate of tube DST1 are cut off when tube DST1 fires.

Power tube PT1 operates output relay RL1. This relay can be either neutral or may be biased polar as desired and may transmit either neutral or polar signals via line L to the receiving system of FIGS. 5, 6.

An electronic time delay switch TDS including thyratron tube ES1, resistors 40, 42 and a capacitor 44 is employed to make possible simpler operation of the tape transmitter. For a reason involving synchronization in the system which will be explained later it is necessary to send "letters" over the line L for a predetermined period of time before the tape is stepped and intelligence transmitted. The purpose of time delay switch circuit TDS is to perform automatically this function at the start of each transmission when a single switch SW2 is thrown manually.

When the switch SW2 is in Off position, the stepping magnet coil 32 is continuously energized. The spacing bus bar 26 is grounded and the marking bus bar 28 is open. By continuously energizing the coil 32, the stepping magnet pulls all reading pins to spacing and a blank letter combination is sent to the line. When the switch SW2 is moved to the On position, ground potential is removed from the spacing bus bar 26 and is applied to the marking bus bar 28. The stepping magnet, however, is still energized setting up a blank letter combination in the transmitter. Transfer of ground potential from the spacing bus bar to the marking bus bar thus results in an all marking letter selection being transmitted to the line L. This transmission persists until the R-C network 40, 42, 44 associated with tube ES1 of the time delay electronic switch allows this tube to fire and pull up relay 45.

*Receiving system*

The receiving system employs a synchronizing circuit to keep the electronic receiving distributor in step with the electronic sending distributor of the sending system. For proper functioning synchronism in both phase and frequency is required between the two distributors.

Figure 4:
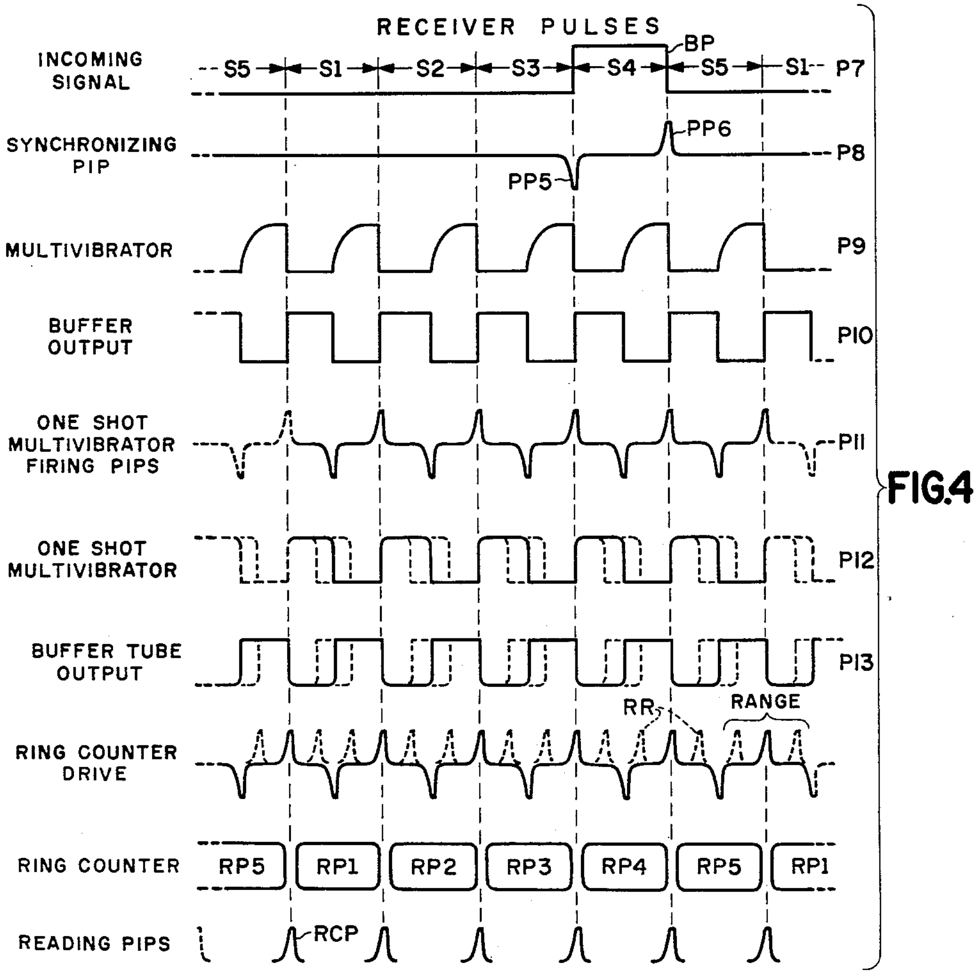
FIG. 4 is a graphic diagram illustrating various wave shapes of receiver pulses employed in the system.

The receiving system shown in FIGS. 5 and 6 taken together to which reference is now made, includes an input circuit having a capacitor C4 used as a shaping means for the incoming signals P7 (pulses S1–S5; see FIG. 4) on line L so that the signals taken off the tongue 50 of receiving relay RL2 will not show the effect of bouncing contacts. A neutral or polar biased relay can be used as the receiving relay RL2. The rectangularly shaped fourth pulse S4 of incoming signals P7 occurs in synchronism with ring counter pulse CP4.

The signals P7 coming off the tongue of the relay RL2 are fed into an amplifier tube AT1. The purpose of this tube is to further shape the incoming signals so that sharp synchronizing pulses P8 can be derived from the crossover of line signals from spacing to marking.

The driving stage of the receiving distributor is a bistable multivibrator MV2. When this multivibrator is free running, it is oscillating at a frequency a little lower than the frequency of the multivibrator MV1 driving the sending distributor and producing pulse P9. The output of amplifier AT1 is differentiated and pips will occur whenever there is a crossover or turnover of the incoming signal as shown at PP5, PP6 of pulses P8 in FIG. 4. These pips are applied to the grid of tube 52 in multivibrator MV2 and thus lock in this the receiving multivibrator to the frequency of the sending mulivibrator MV1. Therefore, it is evident that for frequency synchronization between the receiving and sending systems turnovers of line signal are necessary at all times to maintain synchronism. For this reason pulse CP4 is reversed in this system to produce pulses BP having turnovers and corresponding pips, even when "blanks" are sent during idle periods or when "letters" are sent.

In order to provide the equivalent of a ranging function in this receiving distributor a unistable multivibrator MV3 is provided. The output pulses P9 of multivibrator MV2 are fed into a buffer tube AT2. The output P10 of tube AT2 is differentiated and the resulting positive pips P11 are applied to the trigger grid of the multivibrator MV3. The multivibrator MV3 serves to derive positive driving pulses P12, that may be delayed by a variable amount of time, for a receiving distributor ring counter. These pulses will allow the receiving distributor to be phase shifted with respect to incoming signals and thus allow a receiving range to be taken as shown by the dotted line positions of pulses RR in FIG. 4.

The distributor is a five stage ring counter consisting of five thyratrons V1 to V5. For proper functioning, it is required that pulse RP1 of the receiving distributor bear the proper phase relationship with pulse CP1 of the sending distributor, and the same arrangement should prevail for pulses RP2—RP5 with respect to pulses CP2—CP5. Therefore, it is necessary that when started, the receiving ring counter be in proper phase with respect to the sending ring counter. An auto-synchronizing circuit is used to automatically perform this task as follows.

To start the receiving ring counter V1—V5, a similar arrangement is used to that for the sending ring counter RC1—RC5; but instead of a momentarily operated push button switch, an auto-synchronizing circuit is used which will automatically start the ring counter after "letters" are sent for a period of time, and place it in proper phase.

Two time delay networks TC1 and TC2 are used. Network TC1 is composed of capacitors C5 and C6 and resistors R3 and R4 and has a short time constant as compared to the time constant of network TC2 composed of capacitors C7 and C8 and resistors R5 and R6. When "letters" are sent, the average potential of the output of the line relay RL1 is about 80% of the negative marking voltage. When this condition persists for a period of time, the potential of capacitor C6 and of network TC1 slowly decreases for a negative voltage which will cut off tube TD1 and thus condition a starting tube CS2 to fire on a crossover line signal from spacing to marking. The ring counter V1—V5 is thus started in a similar manner to that described above for ring counter RC1—RC5.

To cut off the starting process after the ring counter is properly fired, the time delay network TC2 is used. Network TC2 reaches the same negative voltage as network TC1 a short time later. When this occurs, a tube TD2 connected network TC2 is cut off. When tube TD2 is cut off, positive potential is applied to the grid network of a tube TD3 connected to tube TD2 and tube TD2 starts to conduct. Tubes TD3 and TD1 have a common plate resistor. Thus when tube TD3 conducts there is no longer a positive potential applied to the grid of the starting tube CS2, and tube CS2 no longer functions in the chain circuit.

When "letters" are sent to start the ring counter, pulse BP is received over the line. The output of input tube AT1 is differentiated by capacitor 60 and applied to the grid resistor network R10, R12 of CS2. This network is designed so that tube CS2 will fire only when tube TD1 is not conducting and a positive pip is received from tube AT1. The cathode of tube CS2 is connected to the cathode of tube V4 which will fire tube V5 and thus the necessary phase relation between the two ring counters RC1—RC5 and V1—V5 will be established.

The incoming signal P7 is delivered to a reperforator 62 at the beginning of ring counter pulse RP5. A storage device is necessary which will accumulate the information till it is delivered at the beginning of each ring counter 5th pulse RP5. For this purpose four thyratrons TH1–TH4 are used. These storage tubes have grid networks designed so that the tubes will fire only when a positive signal (spacing) comes over the line L at the same time a positive pip RCP is received from the ring counter. Thus when a spacing signal (positive) is received over the line a storage tube is set up to fire when a positive pip comes from the ring counter. If a marking signal (negative) is received over the line the tube will be set up and will not fire.

There is no storage tube provided for the 5th pulse RP5 because the delivery of the storage signal to the reperforator 62 is done at the beginning of the ring counter 5th pulse RP5 thus making it necessary for pulse RP5 to be delivered directly to the reperforator.

At the beginning of ring counter fifth RP5 the stored information and fifth pulse 85 of the incoming signal are delivered to the reperforator through transfer tubes. The transfer tubes are five thyratrons R1A–R5A. These transfer tubes have grid networks designed so that the tubes will fire under the influence of a positive potential from an associated storage tube and the incoming ring counter fifth pulse RP5. The grid of each transfer tube is connected through suitable network of resistors 64, 66 and capacitor 68 to the plate of a storage tube, and thus a transfer tube is set up to fire if its associated storage tube is not conducting.

The fourth transfer tube R4A is connected to the cathode of the associated storage tube TH4 to compensate for the reversal of the fourth pulse S4 in the sending system. The fifth pulse RP5 before being directly fed into the transfer tube R5A is inverted in the tube AT4 to have the right polarity.

A thyratron tube R6A is used to furnish the pulse necessary to activate relay 63, whose contacts 61 close the circuit of magnet 64 to effect the punching action of pins 65 on tape TP. The transfer tubes R1A–R5A pulse respective magnets 70, which advance respective code bars 71 into position for striking respective perforating pins 65 when hammer 72 is actuated by magnet 64. Because the punching action should take place at the beginning of ring counter pulse RP5 the grid network of R6A is designed so that R6A will fire and activate the reperforator when a positive pip occurs as counter tube V5 starts to conduct.

It would be advantageous to have the reperforator cut off after "blanks" are transmitted for a certain period of time. For this purpose a time delay network TC3 composed of capacitor, C9 and C10, resistor R8 and potentiometer R7 is used. The incoming signal is applied to network TC3 and after a period of blanks the potential of network TC3 will slowly rise to a certain positive voltage. This time delay network is connected to the grid network of tube COT1 which will start to conduct under the influence of this positive potential. The plate of tube COT1 is connected to the grid of tube R6A which activates the reperforator. Therefore, when tube COT1 conducts the voltage at the grid of R6A decreases beyond cut-off and stop the action of the reperforator. The potentiometer R7 is used to vary the time constant of the time delay network TC3 thus varying the amount of "blanks" necessary to cut off the punching action of the reperforator 62.

To be able to realize the drift between the driving stages of the receiving and sending systems a switch S3 is used. This switch will cut off the pips which lock in the receiving multivibrator MV2 and also will stop the tube COT1 from conducting thus stopping the cut-off action on the reperforator. Therefore, with the reperforator punching and the sending and receiving multivibrators MV1, MV2 running free the drift between them can be observed on the perforated tape. This provides a convenient method for adjusting the receiving multivibrator MV2 to a speed slightly lower than that of the sending multivibrator so that proper synchronizing action may be effected.

Because the storage is transferred to the reperforator at the beginning of ring counter pulse number RP5 and new storage action start at the beginning of ring counter pulse RP1 it is necessary to extinguish and thus clear the storage tubes TH1–TH5 in the middle of ring counter pulse RP5. For this purpose the plates of the storage tubes are connected to the plate of a tube DST2. The grid network of this tube is provided with neon tubes N1, N2 which will fire under the influence of the fifth pulse RP5 from the ring counter and a positive pip P11 from tube TT2 of the multivibrator MV3. The output of tube TT2 is opposite in phase to the output of the buffer tube AT3 which supplies the firing pips for the ring counter. Therefore, a positive pip from tube TT2 will occur in the middle of pulse RP5 and make tube DST2 conduct and thus extinguish the storage tubes because of their plate connections to tube DST2.

I claim:

1. An auto-synchronizing telegraph system, comprising signal sending distributor, a signal receiving distributor in communication with the sending distrbutor, means for transmtting intelligence signals from the sending distributor to the receiving distributor during predetermined time intervals, means for phasing the receiving distributor with the sending distributor prior to the intervals when intelligence signals are transmitted, a multivibrator oscillator driving said receiving distributor, and means for utilizing crossovers of said intelligence signals to lock in said oscillator with said distributor to maintain synchronism between the sending and receiving distributors while said intelligence signals are being transmitted.

2. An auto-synchronizing telegraph system, comprising sending and receiving stations for telegraph signals, means for transmitting intelligence signals from the sending station to the receiving station during predetermined time intervals, a sending distributor at the sending station for generating phasing signals comprising a series of letters characters, each of said characters including four marking pulses and one spacing pulse, a multi-stage receiving distributor at the receiving station, means at the receiving station for utilizing the spacing pulse of one of the letters characters of the phasing signals to condition a predetermined stage of said receiving distributor to initiate cycling thereof, and means utilizing the intelligence signals for mantaining synchronism thereafter between the sending and receiving distributors.

3. An auto-synchronizing telegraph system, comprising sending and receiving stations for telegraph signals, means for transmitting intelligence signals from the sending station to the receiving station during predetermined time intervals, a sending distributor at the sending station for generating phasing signals comprising a series of letters characters, each of said characters including four marking pulses and one spacing pulse, a multi-stage receiving distributor at the receiving station, means at the receiving station for utilizing the spacing pulse of one of the letters characters of the phasing signals to condition a predetermined stage of said receiving distributor to initiate cycling thereof, a multivibrator oscillator driving said receiving distributor, and means for utilizing crossovers of said intelligence signals to lock said multivibrator oscillator in with said receiving distributor to maintain synchronism between the sending and receiving distrbutors while the intelligence signals are being transmitted.

4. An auto-synchronizing telegraph system, comprising sending and receiving stations for telegraph signals, means for transmitting intelligence signals from the sending station to the receiving station during predetermined time intervals, a sending distributor at the sending station for generating phasing signals comprising a series of letters characters, each of said characters including four marking pulses and one spacing pulse, a multi-stage receiving distributor at the receiving station, means at the receiving station for utilizing the spacing pulse of one of the letters characters of the phasing signals to condition a predetermined stage of said receiving distributor to initiate cycling thereof, and means utilizing the intelligence signals for maintaining synchronism thereafter between the sending and receiving distributors, said sending distributor comprising a plural stage ring counter, a free running multivibrator driving said ring counter, a storage circuit connected to and receiving tape stepping pulses from said counter, signal gating means in said counter, a signal combining circuit for receiving stored pulses from said storage circuit as gated thereto by said gating means in the ring counter, and an output relay connected to and driven by said combining circuit to transmit signals to the sending station.

5. An auto-synchronizing telegraph system, comprising sending and receiving stations for telegraph signals, means for transmitting intelligence signals from the sending station to the receiving station during predetermined time intervals, a sending distributor at the sending station for generating phasing signals comprising a series of letters characters, each of said characters including four marking pulses and one spacing pulse, a multi-stage receiving distributor at the receiving station, means at the receiving station for utilizing the spacing pulse of one of the letters characters of the phasing signals to condition a predetermined stage of said receiving distributor to initiate cycling thereof, a multivibrator oscillator driving said receiving distributor, and means for utilizing crossovers of said intelligence signals to lock said multivibrator oscillator in with said receiving distributor to maintain synchronism between the sending and receiving distributors while the intelligence signals are being transmitted, said sending distributor comprising a plural stage ring counter, a free running multivibrator driving said ring counter, a storage circuit connected to and receiving tape stepping pulses from said counter, signal gating means in said counter, a signal combining circuit for receiving stored pulses from said storage circuit as gated thereto by said gating means in the ring counter, and an output relay connected to and driven by said combining circuit to transmit signals to the sending station.

6. An auto-synchronizing telegraph system, comprising sending and receiving stations for telegraph signals, means for transmitting intelligence signals from the sending station to the receiving station during predetermined time intervals, a sending distributor at the sending station for generating phasing signals comprising a series of letters characters, each of said characters including four marking pulses and one spacing pulse, a multi-stage receiving distributor at the receiving station, means at the receiving station for utilizing the spacing pulse of one of the letters characters of the phasing signals to condition a predetermined stage of said receiving distributor to initiate cycling thereof, a multivibrator oscillator driving said receiving distributor, differentiator means generating pips at turnovers of said intelligence signals from space to mark to lock the multivibrator oscillator in with said receiving distributor and maintain synchronism between the sending and receiving distributors while the intelligence signals are being transmitted.

7. An auto-synchronizing telegraph system, comprising sending and receiving stations for telegraph signals, means for transmitting intelligence signals from the sending station to the receiving station during predetermined time intervals, a sending distributor at the sending station for generating phasing signals comprising a series of letters characters, each of said characters including four marking pulses and one spacing pulse, a multi-stage receiving distributor at the receiving station, means at the receiving station for utilizing the spacing pulse of one of the letters characters of the phasing signals to condition a predetermined stage of said receiving distributor to initiate cycling thereof, a multivibrator oscillator driving said receiving distributor, differentiator means generating pips at turnovers of said intelligence signals from space to mark to lock the multivibrator oscillator in with said receiving distributor and maintain synchronism between the sending and receiving distributors while the intelligence signals are being transmitted, said sending distributor comprising a plural stage ring counter, a free running multivibrator driving said ring counter, a storage circuit connected to and receiving tape stepping pulses from said counter, signal gating means in said counter, a signal combining circuit for receiving stored pulses from said storage circuit as gated thereto by said gating means in the ring counter, and an output relay connected to and driven by said combining circuit to transmit signals to the sending station.

8. An auto-synchronizing telegraph system, comprising sending and receiving stations for telegraph signals, means for transmitting intelligence signals from the sending station to the receiving station during predetermined time intervals, a sending distributor at the sending station for generating phasing signals comprising a series of letters characters, each of said characters including four marking pulses and one spacing pulse, a multi-stage receiving distributor at the receiving station, means at the receiving station for utilizing the spacing pulse of one of the letters characters of the phasing signals to condition a predetermined stage of said receiving distributor to initiate cycling thereof, a multivibrator oscillator driving said receiving distributor, differentiator means generating pips at turnovers of said intelligence signals from space to mark to lock the multivibrator oscillator in with said receiving distributor and maintain synchronism between the sending and receiving distributors while the intelligence signals are being transmitted, said sending distributor comprising a plural stage ring counter, a free running multivibrator driving said ring counter, a storage circuit connected to and receiving tape stepping pulses from said counter, signal gating means in said counter, a signal combining circuit for receiving stored pulses from said storage circuit as gated thereto by said gating means in the ring counter, and an output relay connected to and driven by said combining circuit to transmit signals to the sending station, said receiving distributor including another ring counter, and ranging means controlling said other ring counter to shift the phase of counting thereof into conformity with the phase of received intelligence signals.

9. An auto-synchronizing telegraph system, comprising sending and receiving stations for telegraph signals, means for transmitting intelligence signals from the sending station to the receiving station during predetermined time intervals, a sending distributor at the sending station for generating phasing signals comprising a series of letters characters, each of said characters including four marking pulses and one spacing pulse, a multi-stage receiving distributor at the receiving station, means at the receiving station for utilizing the spacing pulse of one of the letters characters of the phasing signals to condition a predetermined stage of said receiving distributor to initiate cycling thereof, a multivibrator oscillator driving said receiving distributor, differentiator means generating pips at turnovers of said intelligence signals from space to mark to lock the multivibrator oscillator in with said receiving distributor and maintain synchronism between the sending and receiving distributors while the intelligence signals are being transmitted, said sending distributor comprising a plural stage ring counter, a free running multivibrator driving said ring counter, a storage circut connected to and receiving tape stepping pulses from said counter, signal gating means in said counter, a signal combining circuit for receiving stored pulses from said storage circuit as gated thereto by said gating means in the ring counter, and an output relay connected to and driven by said combining circuit to transmit signals to the sending station, said receiving distributor including another ring counter, ranging means controlling said other ring counter to shift the phase of counting thereof into conformity with the phase of received signals, the second named means including a starting member for initiating cycling of said other ring counter, said starting member being adapted to fire and start cycling of said other ring counter when a crossover from spacing to marking occurs during the sending of the spacing pulse of said one of the letters characters of the phasing signals, and means for disabling said starting member after cycling of said other ring counter is started.

10. An auto-synchronizing telegraph system, comprising sending and receiving stations for telegraph signals, means for transmitting intelligence signals from the sending station to the receiving station during predetermined time intervals, a sending distributor at the sending station for generating phasing signals comprising a series of letters characters, each of said characters including four marking pulses and one spacing pulse, a multi-stage receiving distributor at the receiving station, means at the receiving station for utilizing the spacing pulse of one of the letters characters of the phasing signals to condition a predetermined stage of said receiving distributor to initiate cycling thereof, a multivibrator oscillator driving said receiving distributor, differentiator means generating pips at turnovers of said intelligence signals from space to mark to lock the multivibrator oscillator in with said receiving distributor and maintain synchronism between the sending and receiving distributors while the intelligence signals are being transmitted, said sending distributor comprising a plural stage ring counter, a free running multivibrator driving said ring counter, a storage circuit connected to and receiving tape stepping pulses from said counter, signal gating means in said counter, a signal combining circuit for receiving stored pulses from said storage circuit as gated thereto by said gating means in the ring counter, and an output relay connected to and driven by said combining circuit to transmit signals to the sending station, said receiving distributor including another ring counter, ranging means controlling said other ring counter to shift the phase of counting thereof into conformity with the phase of received signals, the second named means including a starting member for initiating cycling of said other ring counter, said starting member being adapted to fire and start cycling of said other ring counter when a crossover from spacing to marking occurs during the sending of the spacing pulse of said one of the letters characters of the phasing signals, and means for disabling said starting member after cycling of said other ring counter is started, there being storage means for receiving and storing intelligence signals distributed thereto by the ring counter, and reperforation means for perforating tape with holes corresponding to the stored intelligence signals.

11. An auto-synchronizing telegraph system, comprising sending and receiving stations for telegraph signals, means for transmitting intelligence signals from the sending station to the receiving station during predetermined time intervals, a sending distributor at the sending station for generating phasing signals comprising a series of letters characters, each of said characters including four marking pulses and one spacing pulse, a multi-stage receiving distributor at the receiving station, means at the receiving station for utilizing the spacing pulse of one of the letters characters of the phasing signals to condition a predetermined stage of said receiving distributor to initiate cycling thereof, a multivibrator oscillator driving said receiving distributor, differentiator means generating pips at turnovers of said intelligence signals from space to mark to lock the multivibrator oscillator in with said receiving distributor and maintain synchronism between the sending and receiving distributors while the intelligence signals are being transmitted, said sending distributor comprising a plural stage ring counter, a free running multivibrator driving said ring counter, a storage circuit connected to and receiving tape stepping pulses from said counter, signal gating means in said counter, a signal combining circuit for receiving stored pulses from said storage circuit as gated thereto by said gating means in the ring counter, and an output relay connected to and driven by said combining circuit to transmit signals to the sending station, said receiving distributor including another ring counter, ranging means controlling said other ring counter to shift the phase of counting thereof into conformity with the phase of received signals, the second named means including a starting member for initiating cycling of said other ring counter, said starting member being adapted to fire and start cycling of said other ring counter when a crossover from spacing to marking occurs during the sending of the spacing pulse of said one of the letters characters of the phasing signals, and means for disabling said starting member after cycling of said other ring counter is started there being storage means for receiving and storing intelligence signals distributed thereto by the ring counter, reperforation means for perforating tape with holes corresponding to the stored intelligence signals, and signal transfer means to actuate the reperforation means and punch the tape in a code corresponding to the stored signals in said storage means at a predetermined state of counting of said other ring counter.

References Cited in the file of this patent

UNITED STATES PATENTS 2,000,765 Lemmon ---------------- May 7, 1935